(12) United States Patent
Ciurea (10) Patent No.: US 8,090,214 B2
(45) Date of Patent: Jan. 3, 2012

(54) METHOD FOR AUTOMATIC DETECTION AND CORRECTION OF HALO ARTIFACTS IN IMAGES

(75) Inventor: Florian Ciurea, San Jose, CA (US)

(73) Assignees: Sony Corporation, Tokyo (JP); Sony Electronics Inc., San Diego, CA (US)

(*) Notice: Subject to any disclaimer, the term of this patent is extended or adjusted under 35 U.S.C. 154(b) by 1046 days.

(21) Appl. No.: 12/004,855

(22) Filed: Dec. 21, 2007

(65) Prior Publication Data

US 2009/0161983 A1    Jun. 25, 2009

(51) Int. Cl.
*G06K 9/40* (2006.01)
*G06K 9/48* (2006.01)

(52) U.S. Cl. .................. 382/275; 382/242; 382/266

(58) Field of Classification Search .................. None
See application file for complete search history.

(56) References Cited

U.S. PATENT DOCUMENTS

| | | | | |
|---|---|---|---|---|
| 5,294,989 A | | 3/1994 | Moore et al. ............. | 348/241 |
| 5,426,517 A | | 6/1995 | Schwartz ................. | 358/520 |
| 6,150,814 A | * | 11/2000 | Redpath et al. .......... | 324/307 |
| 6,198,845 B1 | | 3/2001 | Tse et al. ................. | 382/169 |
| 6,795,113 B1 | | 9/2004 | Jackson et al. .......... | 348/207 |
| 6,826,304 B2 | | 11/2004 | Levy et al. ............... | 382/167 |
| 6,987,881 B2 | | 1/2006 | Nakajima et al. ........ | 382/173 |
| 7,046,397 B2 | | 5/2006 | Loce et al. .............. | 358/1.9 |
| 7,522,313 B2 | * | 4/2009 | Dalal et al. ............. | 358/3.26 |
| 7,522,314 B2 | | 4/2009 | Atkins | |
| 2004/0165086 A1 | * | 8/2004 | Spitzer et al. .......... | 348/239 |
| 2007/0058222 A1 | * | 3/2007 | Dalal et al. ............. | 358/518 |

FOREIGN PATENT DOCUMENTS

EP    0501728 B1    4/1998

OTHER PUBLICATIONS

Meylan et al. High Dynamic Range Image Rendering With Retinex-based Apdaptive Filter, 2006, IEEE transaction on Image processing, vol. 15 No. 9, pp. 2820-2830.*
Sun et al. "Modified Luminance Based Adaptive MSR", Aug. 2007, 4th Intenational Conference on Image and Graphics, pp. 116-120.*
Gregory Ward Larson, "A Visibility Matching Tone Reproduction Operator for High Dynamic Range Scenes", Jan. 15, 1997, pp. 1-35, Copyright 1997 Regents of the University of California subject to the approval of the Department of Energy.
Jack Tumblin and Greg Turk, "LCIS: A Boundary Hierarchy for Detail-Preserving Contrast Reduction", pp. 1-8, Georgia Institute of Technology.

* cited by examiner

*Primary Examiner* — Randolph I Chu
(74) *Attorney, Agent, or Firm* — Haverstock & Owens LLP (57) ABSTRACT

A method of automatically detecting and correcting halo artifacts within a processed image is described. The method computes a two-dimensional (2D) gradient field of the original image and a 2D gradient field of the processed image. Each gradient field includes a gradient vector corresponding to each pixel. To detect halo artifacts, the gradient vector at each pixel of the original image is compared to the gradient vector at the corresponding pixel of the processed image. A halo artifact is determined to exist at a given pixel if a direction of the two corresponding gradient vectors differs by at least a specified threshold. To correct the halo artifacts, a composite gradient field is generated using one of three correction methods. A final image is generated by integrating the newly generated composite gradient field using known integration methods from a 2D gradient field such as ones based on the Fast Fourier Transform.

42 Claims, 7 Drawing Sheets

METHOD FOR AUTOMATIC DETECTION AND CORRECTION OF HALO ARTIFACTS IN IMAGES

FIELD OF THE INVENTION

The present invention relates to the field of imaging. More particularly, the present invention relates to a method of automatic detection and correction of halo artifacts in images.

BACKGROUND OF THE INVENTION

Figure 1A:
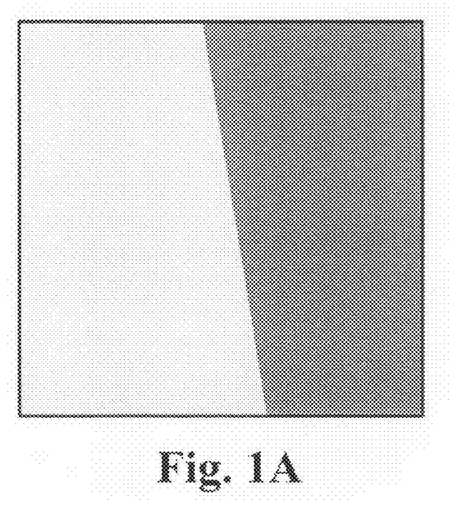
FIG. 1A illustrates an unprocessed image.
Figure 1B:
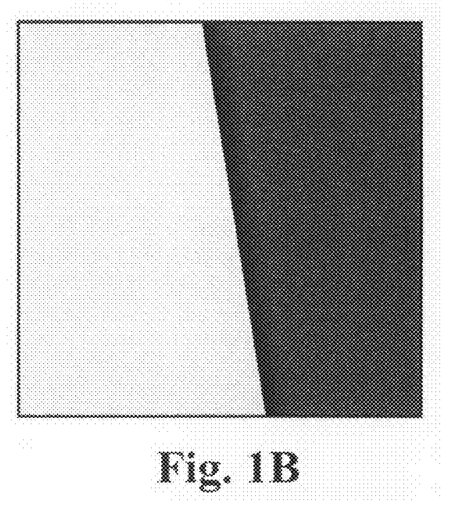
FIG. 1B illustrates a corresponding processed image including a halo artifact.

Halo artifacts are a type of image artifacts that appear visible across edges of an image that has generally been processed by an image processing algorithm. These artifacts are characterized by overestimation ("overshoot") on one side of the edge and underestimation ("undershoot") on the other side of the edge. Halo artifacts typically appear as visible, unwanted shadows across the edges in the processed image. FIG. 1A illustrates an original, unprocessed image, while FIG. 1B illustrates a halo artifact in the processed image. The halo artifact is most prevalent across the edge between the light area on the left and the darker area on the right. Common image processing methods that generate halo artifacts are high dynamic range compression methods, which rely on Gaussian style blurring (such as Land and McCann's Retinex method). Other common methods that may generate halo artifacts are edge enhancement methods, which include unsharp masking and Wallis Filter [statistical differencing], and other filtering methods.

In the paper, "Gradient domain high dynamic range compression" by Fattal et al., the idea of performing high dynamic range compression by modifying only the magnitudes of the two-dimensional gradient field is proposed. The gradient field is computed as the finite difference in adjacent pixel intensities across a luminance (grayscale) image, on both the horizontal and vertical directions of the image. For each pixel location, the set of horizontal and vertical gradient form a two-dimensional gradient vector. This two-dimensional gradient vector can be characterized by direction and magnitude. The gradient field associated with a specific image includes a plurality of gradient vectors. Fattal et al. propose a method for dynamic range compression that is free from halo artifacts by computing the two-dimensional gradient field in the original image and attenuating only the magnitude of the gradient vectors, preserving the direction of the gradient vectors.

SUMMARY OF THE INVENTION

A method of automatic detection and correction of halo artifacts within a processed image is described. Halo artifacts are typically manifested as bands or shadows along edges within an image that has been processed using one or more processing algorithms. The detection and the correction methods rely on computing a two-dimensional gradient field of the original image and a two-dimensional gradient field of the processed image. Each gradient field includes a gradient vector corresponding to each pixel. To detect halo artifacts, the gradient vector at each pixel of the original image is compared to the gradient vector at the corresponding pixel of the processed image. A halo artifact is determined to exist at a given pixel if the direction of the two corresponding gradient vectors differs by at least a specified threshold amount.

To correct the halo artifacts, a composite gradient field is generated. In a first correction method, a composite gradient vector is generated for each pixel. If a halo artifact is deemed to exist at a given pixel, then the composite gradient vector includes the direction from the corresponding gradient vector in the original image and the magnitude from the corresponding gradient vector in the processed image. If a halo artifact is not deemed to exist at a given pixel, then the composite gradient vector includes the direction and magnitude from the corresponding gradient vector in the processed image. In a second correction method, the composite gradient vector for each pixel includes the direction from the corresponding gradient vector in the original image and the magnitude from the corresponding gradient vector in the processed image. In a third correction method, if a halo artifact is deemed to exist at a given pixel, then the composite gradient vector includes the direction and magnitude from the corresponding gradient vector in the original image. If a halo artifact is not deemed to exist at a given pixel, then the composite gradient vector includes the direction from the corresponding gradient vector in the original image and the magnitude from the corresponding gradient vector in the processed image. A final image is generated by integrating the newly generated composite gradient field using known two-dimensional integration methods such as ones based on the Fast Fourier Transform.

In one aspect, a method of detecting halo artifacts in an image is disclosed. The method comprises determining a first two-dimensional gradient field for an image, wherein the first gradient field includes a plurality of first gradient vectors, one first gradient vector associated with each pixel in the image, determining a second two-dimensional gradient field for the processed image, wherein the second gradient field includes a plurality of second gradient vectors, one second gradient vector associated with each pixel in the processed image, wherein a first pixel in the image corresponds to a first pixel in the processed image, calculating a gradient angle for each pixel, wherein a first gradient angle is an angle between a first gradient vector and a second gradient vector associated with the first pixel, and calculating a relative angle for each pixel, wherein a first relative angle for the first pixel is the minimum between the first gradient angle and 360 degrees minus the first gradient angle. In some embodiments, a halo artifact value at each pixel is defined as the relative angle at the pixel. In other embodiments, a halo artifact value at each pixel is defined as a magnitude of the second gradient vector at the pixel. In some embodiments, the first gradient angle between the first gradient vector and the second gradient vector is the absolute value. In some embodiments, the first gradient field is determined according to a scale that identifies a pixel separation distance used in the determination of each first gradient vector. In some embodiments, the second gradient field is determined according to the scale. As a general rule, the scale increases as noise in the image increases. In some embodiments, the image is a grayscale image. If the image is a color image, the method further comprises converting the image to a grayscale image before determining the first two-dimensional gradient field.

In another aspect, a method of correcting halo artifacts in an image is disclosed. The method comprises determining a first two-dimensional gradient field for an image, wherein the first gradient field includes a plurality of first gradient vectors, each first gradient vector includes a first magnitude and a first direction, determining a second two-dimensional gradient field for the processed image, wherein the second gradient field includes a plurality of second gradient vectors, each second gradient vector includes a second magnitude and a second direction, further wherein each second gradient vector corresponds to a specific first gradient vector, thereby forming a first gradient vector and second gradient vector pair, generating a third two-dimensional gradient field, wherein the third gradient field includes a plurality of third gradient vectors, each third gradient vector corresponds to a specific first gradient vector and second gradient vector pair, and each third gradient vector includes a third magnitude equal to the second magnitude of the corresponding second gradient vector and a third direction equal to the first direction of the corresponding first gradient vector, and integrating the third gradient field thereby generating a corrected image. In some embodiments, integrating the third gradient field comprises integrating the third gradient field according to known integrating methods from a two-dimensional gradient field based on a Fast Fourier Transform. In some embodiments, the plurality of first gradient vectors includes one first gradient vector for each pixel in the image. In some embodiments, the plurality of second gradient vectors includes one second gradient vector for each pixel in the processed image, wherein a first pixel in the image corresponds to a first pixel in the processed image. In some embodiments, one first gradient vector and second gradient vector pair corresponds to each pixel. In some embodiments, the first gradient field is determined according to a scale that identifies a pixel separation distance used in the determination of each first gradient vector. In some embodiments, the second gradient field is determined according to the scale. In some embodiments, the image is a grayscale image. If the image is a color image, the method further comprises converting the image to a grayscale image before determining a first two-dimensional gradient field.

In yet another aspect, a method of detecting and correcting halo artifacts in an image is disclosed. The method comprises determining a first two-dimensional gradient field for an image, wherein the first gradient field includes a plurality of first gradient vectors, each first gradient vector includes a first magnitude and a first direction, determining a second two-dimensional gradient field for the processed image, wherein the second gradient field includes a plurality of second gradient vectors, each second gradient vector includes a second magnitude and a second direction, quantifying a halo artifact value at each pixel, generating a third two-dimensional gradient field, wherein the third gradient field includes a plurality of third gradient vectors, each third gradient vector includes a third magnitude and a third direction, further wherein if the halo artifact value at a given pixel is less than a predetermined value, then the third magnitude equals the second magnitude and the third direction equals the second direction at the given pixel, and if the halo artifact value at the given pixel is greater than or equal to the predetermined value, then the third magnitude equals the second magnitude and the third direction equals the first direction at the given pixel, and integrating the third gradient field thereby generating a corrected image. In some embodiments, quantifying a halo artifact value at each pixel comprises calculating a gradient angle for each pixel, wherein the gradient angle defines a difference in the direction between the first gradient vector and the second gradient vector at the given pixel, and calculating a relative angle for each pixel, wherein the relative angle for the given pixel is the minimum between the gradient angle at the given pixel and 360 degrees minus the gradient angle at the given pixel, further wherein the relative angle equals the halo artifact value at each pixel. In some embodiments, each second gradient vector corresponds to a specific first gradient vector, thereby forming a first gradient vector and second gradient vector pair, and each third gradient vector corresponds to a specific first gradient vector and second gradient vector pair. In some embodiments, one first gradient vector associated with each pixel in the image and one second gradient vector associated with each pixel in the processed image, further wherein a first pixel in the image corresponds to a first pixel in the processed image. In some embodiments, a first gradient angle is an angle between a first gradient vector and a second gradient vector associated with the first pixel. In some embodiments, integrating the third gradient field comprises integrating the third gradient field according to known integration methods from a two-dimensional gradient field based on a Fast Fourier Transform. In some embodiments, the first gradient field is determined according to a scale that identifies a pixel separation distance used in the determination of each first gradient vector. In some embodiments, the second gradient field is determined according to the scale. In some embodiments, the image is a grayscale image. If the image is a color image, the method further comprises converting the image to a grayscale image before determining a first two-dimensional gradient field.

In another aspect, a method of detecting and correcting halo artifacts in an image is disclosed. The method includes determining a first two-dimensional gradient field for an image, wherein the first gradient field includes a plurality of first gradient vectors, each first gradient vector includes a first magnitude and a first direction, determining a second two-dimensional gradient field for the processed image, wherein the second gradient field includes a plurality of second gradient vectors, each second gradient vector includes a second magnitude and a second direction, quantifying a halo artifact value at each pixel, generating a third two-dimensional gradient field, wherein the third gradient field includes a plurality of third gradient vectors, each third gradient vector includes a third magnitude and a third direction, further wherein if the halo artifact value at a given pixel is less than a predetermined value, then the third magnitude equals the second magnitude and the third direction equals the first direction at the given pixel, and if the halo artifact value at the given pixel is greater than or equal to the predetermined value, then the third magnitude equals the first magnitude and the third direction equals the first direction at the given pixel, and integrating the third gradient field thereby generating a corrected image. In some embodiments, quantifying the halo artifact value at each pixel includes calculating a gradient angle for each pixel, wherein the gradient angle defines a difference in the direction between the first gradient vector and the second gradient vector at the given pixel, and calculating a relative angle for each pixel, wherein the relative angle for the given pixel is the minimum between the gradient angle at the given pixel and 360 degrees minus the gradient angle at the given pixel, further wherein the relative angle equals the halo artifact value at each pixel. In some embodiments, the predetermined value is 90 degrees. In some embodiments, each second gradient vector corresponds to a specific first gradient vector, thereby forming a first gradient vector and second gradient vector pair, and each third gradient vector corresponds to a specific first gradient vector and second gradient vector pair. In some embodiments, one first gradient vector is associated with each pixel in the image and one second gradient vector is associated with each pixel in the processed image, further wherein a first pixel in the image corresponds to a first pixel in the processed image. In this case, a first gradient angle is an angle between a first gradient vector and a second gradient vector associated with the first pixel. In some embodiments, integrating the third gradient field comprises integrating the third gradient field according to known integration methods from a two-dimensional gradient field based on a Fast Fourier Transform. In some embodiments, the first gradient field is determined according to a scale that identifies a pixel separation distance used in the determination of each first gradient vector. In this case, the second gradient field is also determined according to the scale. In some embodiments, the image is a grayscale image. If the image is a color image, the method further comprises converting the image to a grayscale image before determining a first two-dimensional gradient field.

In still yet another aspect, an apparatus for detecting halo artifacts in an image is disclosed. The apparatus includes an application, a processor configured for executing the application, and a memory coupled to the processor, the memory configured for temporarily storing data for execution by the processor. The application is configured for determining a first two-dimensional gradient field for an image, wherein the first gradient field includes a plurality of first gradient vectors, each first gradient vector includes a first magnitude and a first direction, determining a second two-dimensional gradient field for the processed image, wherein the second gradient field includes a plurality of second gradient vectors, each second gradient vector includes a second magnitude and a second direction, quantifying a halo artifact value at each pixel, generating a third two-dimensional gradient field, wherein the third gradient field includes a plurality of third gradient vectors, each third gradient vector includes a third magnitude and a third direction, further wherein if the halo artifact value at a given pixel is less than a predetermined value, then the third magnitude equals the second magnitude and the third direction equals the second direction at the given pixel, and if the halo artifact value at the given pixel is greater than or equal to the predetermined value, then the third magnitude equals the second magnitude and the third direction equals the first direction at the given pixel, and integrating the third gradient field thereby generating a corrected image.

In another aspect, an apparatus for correcting halo artifacts in an image is disclosed. The apparatus includes an application, a processor configured for executing the application, and a memory coupled to the processor, the memory configured for temporarily storing data for execution by the processor. The application is configured for determining a first two-dimensional gradient field for an image, wherein the first gradient field includes a plurality of first gradient vectors, each first gradient vector includes a first magnitude and a first direction, determining a second two-dimensional gradient field for the processed image, wherein the second gradient field includes a plurality of second gradient vectors, each second gradient vector includes a second magnitude and a second direction, further wherein each second gradient vector corresponds to a specific first gradient vector, thereby forming a first gradient vector and second gradient vector pair, generating a third two-dimensional gradient field, wherein the third gradient field includes a plurality of third gradient vectors, each third gradient vector corresponds to a specific first gradient vector and second gradient vector pair, and each third gradient vector includes a third magnitude equal to the second magnitude of the corresponding second gradient vector and a third direction equal to the first direction of the corresponding first gradient vector, and integrating the third gradient field thereby generating a corrected image.

In yet another aspect, an apparatus for detecting halo artifacts in an image is disclosed. The apparatus includes an application, a processor configured for executing the application, and a memory coupled to the processor, the memory configured for temporarily storing data for execution by the processor. The application is configured for determining a first two-dimensional gradient field for an image, wherein the first gradient field includes a plurality of first gradient vectors, each first gradient vector includes a first magnitude and a first direction, determining a second two-dimensional gradient field for the processed image, wherein the second gradient field includes a plurality of second gradient vectors, each second gradient vector includes a second magnitude and a second direction, quantifying a halo artifact value at each pixel, generating a third two-dimensional gradient field, wherein the third gradient field includes a plurality of third gradient vectors, each third gradient vector includes a third magnitude and a third direction, further wherein if the halo artifact value at a given pixel is less than a predetermined value, then the third magnitude equals the second magnitude and the third direction equals the first direction at the given pixel, and if the halo artifact value at the given pixel is greater than or equal to the predetermined value, then the third magnitude equals the first magnitude and the third direction equals the first direction at the given pixel, and integrating the third gradient field thereby generating a corrected image.

BRIEF DESCRIPTION OF THE DRAWINGS

Embodiments of the detection and correction method are described relative to the several views of the drawings. Where appropriate and only where identical elements are disclosed and shown in more than one drawing, the same reference numeral will be used to represent such identical elements.

DETAILED DESCRIPTION OF THE EMBODIMENTS

The detection and correction methods address the problem of unsupervised detection and correction of halo artifacts in a processed image. Embodiments of the detection and correction methods are based on the observation that in processed images that contain halo artifacts, the halo artifacts appear as reversed gradients across edges within the two images. The detection method detects halo artifacts and points to the image regions where they occur. In particular, the detection method describes a manner of quantifying the halo artifacts by measuring the gradient angle between the two-dimensional gradient fields in the original image and the processed image.

The detection and correction methods are completely automatic and do not rely on a specific target. Instead, the detection and correction methods are based on comparing the two-dimensional (2D) gradient field in the original, unprocessed image and the 2D gradient field in the processed image containing halo artifacts. Halo artifacts are present in those regions of the processed image where the direction of the gradient field is reversed, or is significantly different, as compared to the same region in the original image.

Figure 2:
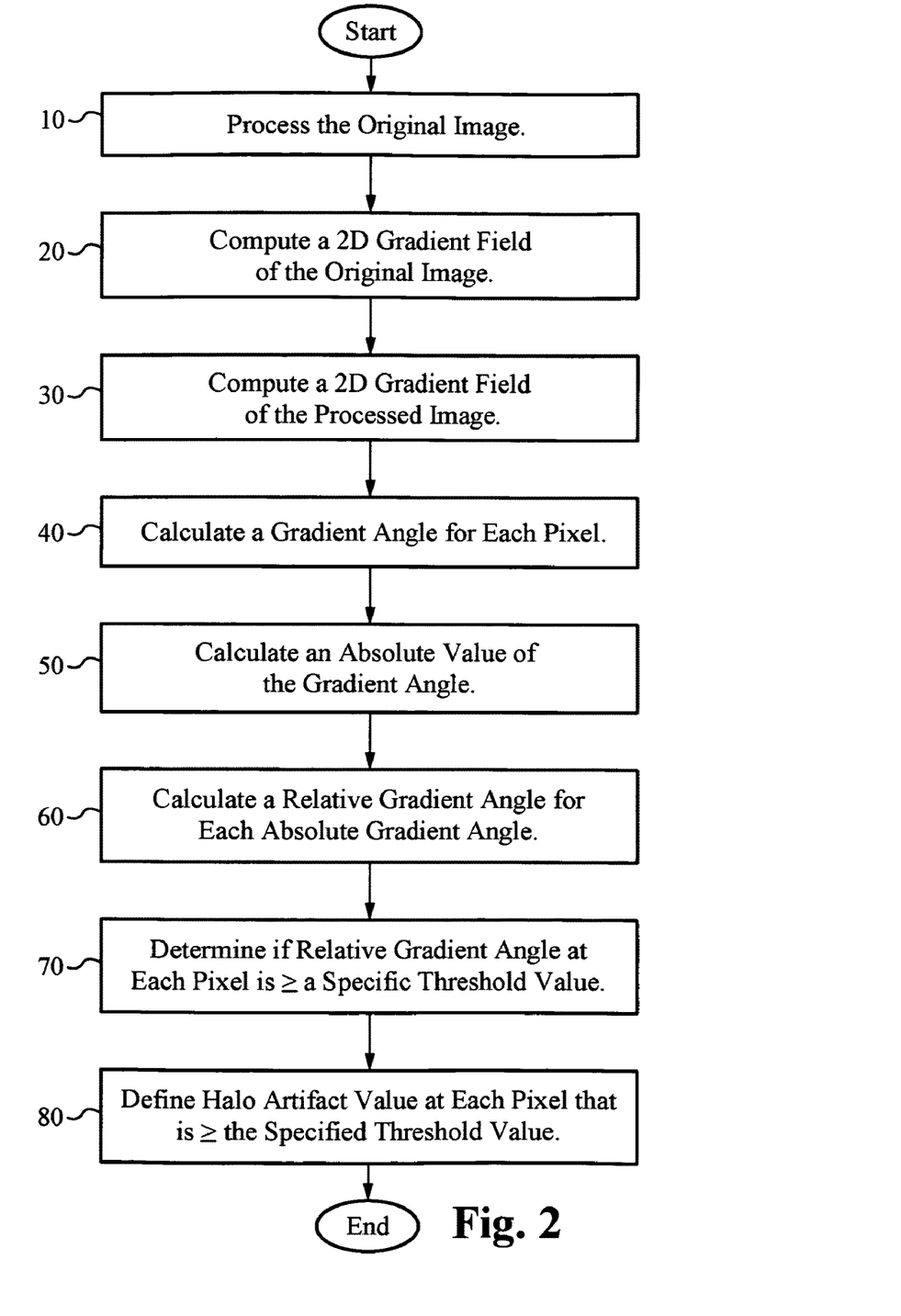
FIG. 2 illustrates a method of detecting halo artifacts.

FIG. 2 illustrates a method of detecting halo artifacts. At the step 10, an original image is processed according to one or more processing algorithms, including but not limited to, a high dynamic range compression algorithm. As a result of processing the original image using one of these processing algorithms, halo artifacts may be generated. To detect such halo artifacts, at the step 20, a two-dimensional gradient field is calculated for the original image. In some embodiments, the 2D gradient field for the original image includes one gradient vector for every n<sup>th</sup> pixel within the original image. At the step 30, a two-dimensional gradient field is computed for the processed image generated in the step 10. In some embodiments, the 2D gradient field for the processed image includes one gradient vector for every n<sup>th</sup> pixel within the processed image. Each pixel within the original image corresponds to a specific pixel in the processed image. Both the 2D gradient field for the original image and the 2D gradient field for the processed image are computed according to a specific scale. The scale identifies the number of pixels used in the computation of each gradient vector. For example, if the scale is 1, to compute the gradient vector for pixel A, the pixels adjacent to pixel A are used. For a scale of 10, the gradient vector for pixel A is computed using pixels ten (10) pixels apart from pixel A. The gradient field is computed in both the x-direction and the y-direction. Both the magnitude and the direction of the gradient field, as defined by the gradient vector, is determined for each pixel. The magnitude of the gradient vector quantifies the difference between the pixel associated with the gradient vector and the surrounding pixels separated by the scale.

Figure 3:
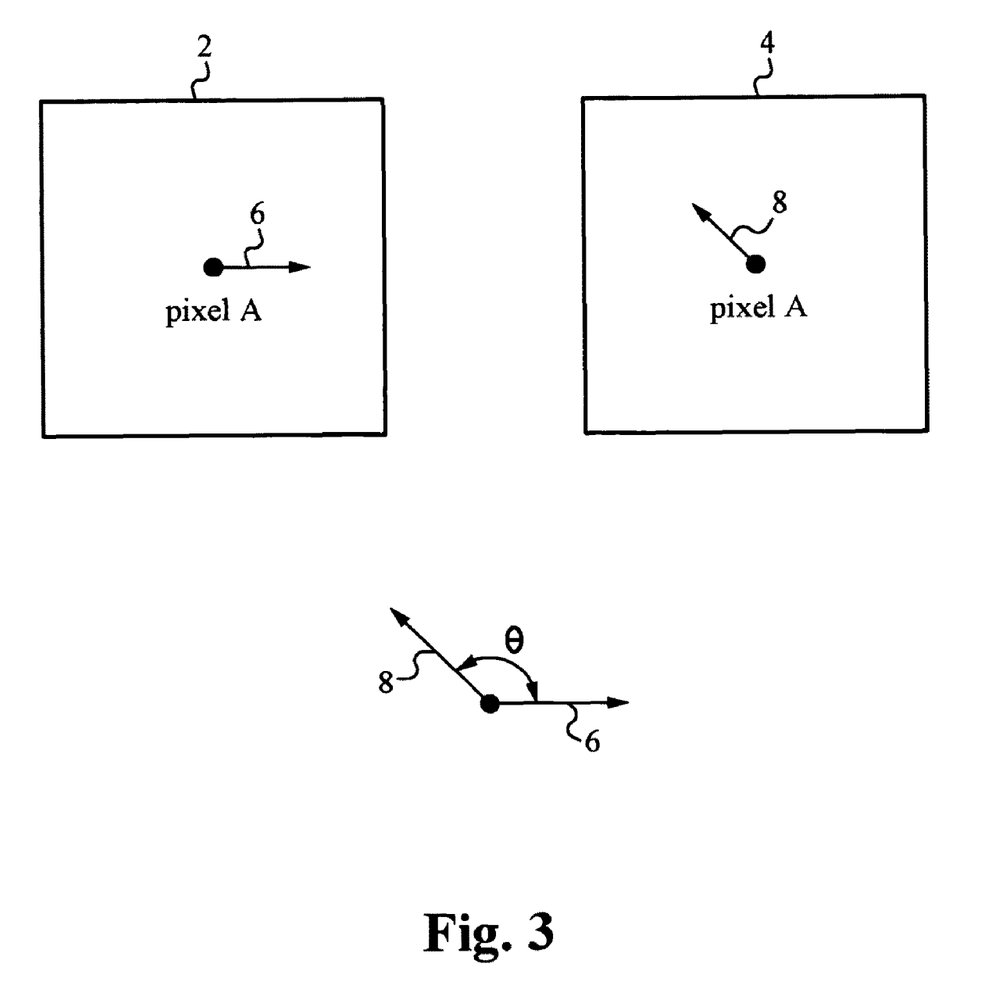
FIG. 3 illustrates an exemplary gradient angle.

At the step 40, a gradient angle for each pixel is calculated. For each pixel, there is a corresponding gradient vector of the original image and a gradient vector of the processed image. The gradient angle is calculated as the difference in direction between the two gradient vectors. FIG. 3 illustrates an exemplary gradient angle θ. A gradient vector 6 is associated with pixel A within an original image 2. A gradient vector 8 is associated with pixel A within a corresponding processed image 4. The directional difference between the gradient vector 4 and the gradient vector 8 is the gradient angle θ. In some embodiments, the gradient angle is measured according to standard polar coordinates. For example, if the gradient vector points horizontally from left to right, the angle is zero. If the gradient vector points horizontally from right to left, the angle is 180 degrees.

At the step 50 (FIG. 2), the absolute value is calculated for each gradient angle calculated in the step 40. The result is referred to as the absolute gradient angle, which is measured in degrees. At the step 60, a relative gradient angle is calculated for each absolute gradient angle calculated in the step 50. The relative gradient angle is calculated as the minimum between the absolute gradient angle and 360 minus the absolute gradient angle. In this manner, the relative gradient angle has a value less than or equal to 180 degrees. At pixel A, if the gradient vectors from the original image and the processed image are in complete opposite direction, the relative gradient angle at pixel A has a maximum value. If the gradient vectors are in the same direction, the relative gradient angle is zero.

At the step 70, it is determined if the relative gradient angle calculated at the step 60 is greater than or equal to a specific threshold value. At the step 80, a halo artifact value is defined for each pixel that has a relative gradient angle greater than or equal to the threshold value. In a first method of detection, the halo artifact value for each such pixel is defined as the value of the relative gradient angle. In a second method of detection, the specified threshold value is defined as 90 degrees, and for each pixel that has a relative gradient angle greater than or equal to 90 degrees, the halo artifact value is defined by the magnitude of the gradient vector in the processed image. The detection method automatically quantifies and identifies areas in the original image that give rise to halo artifacts due to a variety of spatial processing techniques.

The gradient field is susceptible to noise. The scale at which the gradient vectors are computed can be adjusted to affect the robustness of the method. For example, if the image is noisy, the gradient field is calculated using a larger scale. For images that are expected to be noise-free, a scale of 1 may be appropriate. A scale of 1 simply means that gradients are computed by discrete differences between adjacent pixels in the image. For noisier images, a scale of 3 or 5 may provide more robust results. For additional robustness, a threshold for low values of the relative gradient angle can be used such that values very close to zero are identified as "no halo artifacts" instead of "low halo artifacts." In other words, for small relative gradient angles, the relative gradient angle is treated as zero degrees in some applications, which corresponds to no halo artifact.

The detection method described above works for grayscale images. For typical color images, the method is applied by first converting the image to grayscale.

The correction methods provide automated correction of halo artifacts. The correction methods include computing and comparing the 2D gradient field of the original and processed images. Correction for the halo artifacts is accomplished using one of three methods. In a first correction method, the correction method is applied only to those pixels where the calculated relative gradient angle is greater than or equal to the specific threshold. In this case, a new 2D gradient field is determined where the magnitude and direction of the gradient vector for those pixels where the relative gradient angle is less than the specific threshold is determined according to the magnitude and direction of the gradient vector of the processed image. For those pixels where the relative gradient angle is greater than or equal to the specific threshold, the direction of the new 2D gradient vector is determined according to the direction of the gradient vector in the original image and the magnitude of the new 2D gradient vector is determined according to the magnitude of the gradient vector in the processed image. In a second correction method, the new 2D gradient field is determined by taking the direction from the original image and the magnitude from the processed image at every pixel, regardless of the value of the relative gradient angle at a given pixel. In a third correction method, the new 2D gradient filed is determined where the magnitude and direction of the gradient vector for those pixels where the relative gradient angle is greater than or equal to 90 degrees is determined according to the magnitude and direction of the gradient vector of the original image. For those pixels where the relative gradient angel is less than 90 degrees, the direction of the new 2D gradient vector is determined according to the direction of the gradient vector in the original image and the magnitude of the new 2D gradient vector is determined according to the magnitude of the gradient vector in the processed image.

Figure 4:
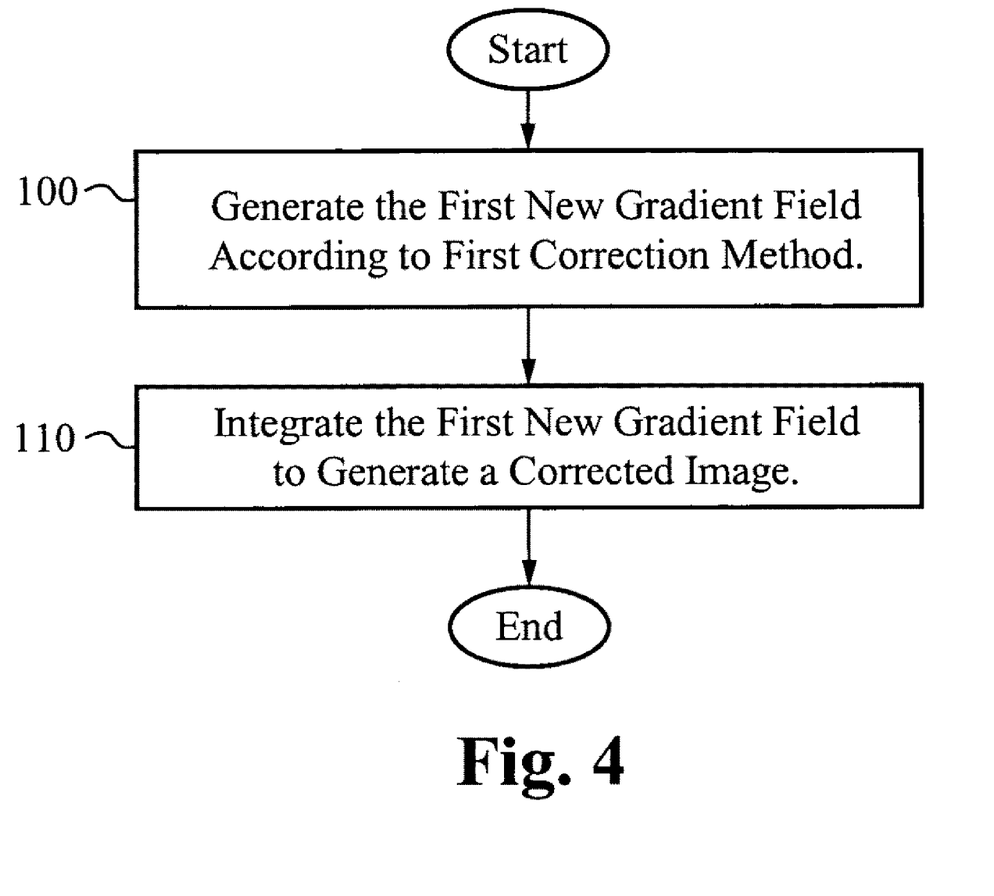
FIG. 4 illustrates a first correction method.

FIG. 4 illustrates the first correction method. At the step 100, a first new 2D gradient field is generated. When the gradient field of the original image and the gradient field of the processed image each include one gradient vector for each pixel, the new gradient field also includes one gradient vector for each pixel. For a given pixel, the relative gradient angle is compared to a specific threshold value. If it is determined that the relative gradient angle meets or exceeds the specified threshold, for example as determined at the step 70 in FIG. 2, then for the given pixel, the direction of the gradient vector for the first new gradient field is equal to the direction of the corresponding gradient vector for the gradient field of the original image. If instead it is determined that the relative gradient angle is less than the specified threshold, then the direction of the gradient vector for the first new gradient field is equal to the direction of the corresponding gradient vector for the gradient field of the processed image. The magnitude of the gradient vector for the first new gradient field is equal to the magnitude of the corresponding gradient vector for the gradient field of the processed image, regardless of the value of the relative gradient angle. In this manner, the first correction method is applied to select regions to eliminate or reduce the halo artifacts. At the step 110, the new gradient field is integrated to generate a corrected image. In some embodiments, the integration is performed according to a Fast Fourier Transform.

In the second correction method, correcting the halo artifacts does not require quantifying the halo artifacts. Instead, each gradient vector for a second new gradient field is generated by using the magnitude from the gradient vector of the processed image and the direction from the gradient vector of the original image. As described above, the original image is processed according to one or more processing algorithms that generate halo artifacts, thereby generating the processed image that includes halo artifacts. The 2D gradient field is then calculated for the original image and the 2D gradient field is computed for the processed image. Both the 2D gradient field for the original image and the 2D gradient field for the processed image are computed according to a specific scale, as previously described. Both the magnitude and the direction of the gradient field, as defined by the gradient vector, is determined for each pixel.

Figure 5:
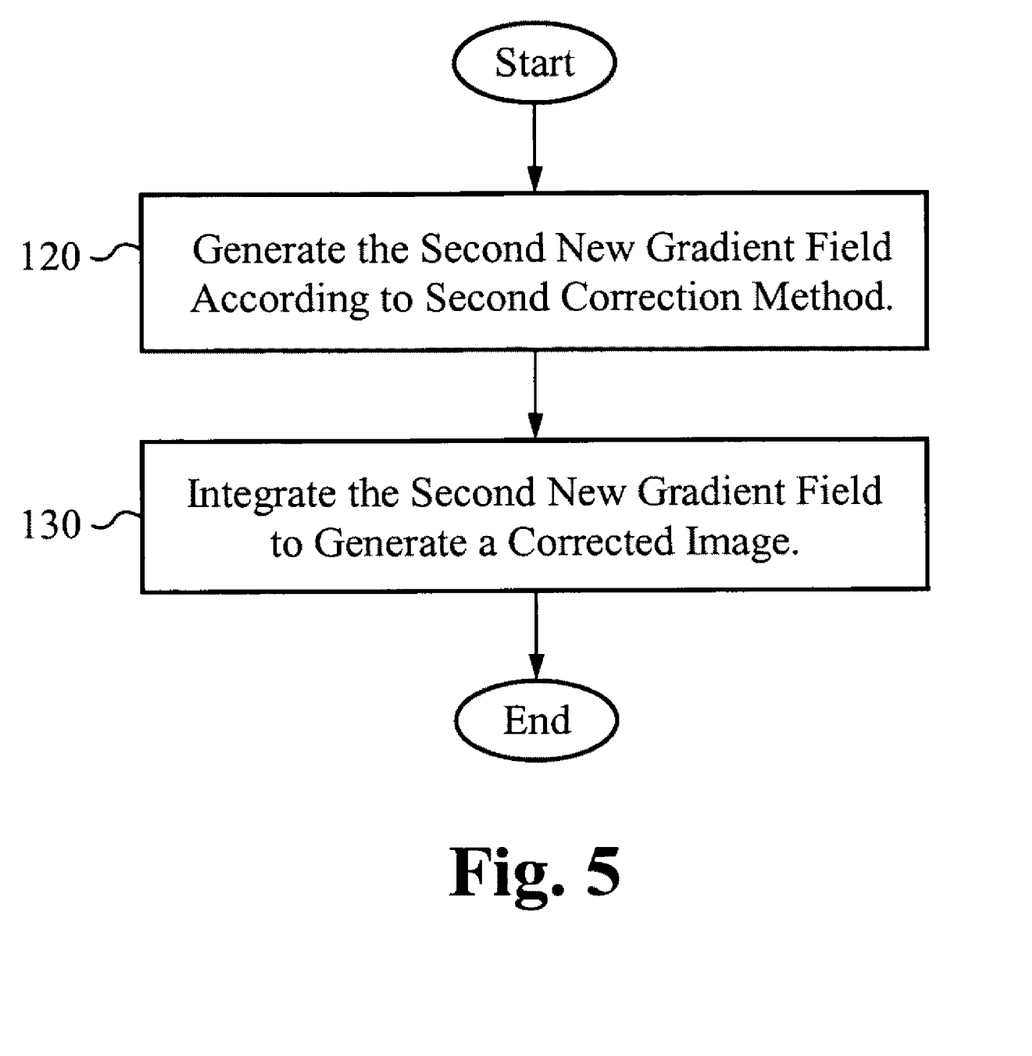
FIG. 5 illustrates a second correction method.

FIG. 5 illustrates the second correction method. At the step 120, a second new 2D gradient field is generated. Each gradient vector within the second new 2D gradient field is determined by taking the direction from the gradient vector of the original image and the magnitude from the gradient vector of the processed image at every pixel, regardless of whether or not a halo artifact exists at a given pixel. In this manner, the magnitude of the gradient vector for the second new gradient field is equal to the magnitude of the corresponding gradient vector for the gradient field of the processed image, and the direction of the gradient vector for the second new gradient field is equal to the direction of the corresponding gradient vector for the gradient field of the original image. At the step 130, the second new gradient field is integrated to generate a corrected image. In some embodiments, the integration is performed according to a Fast Fourier Transform.

Figure 6:
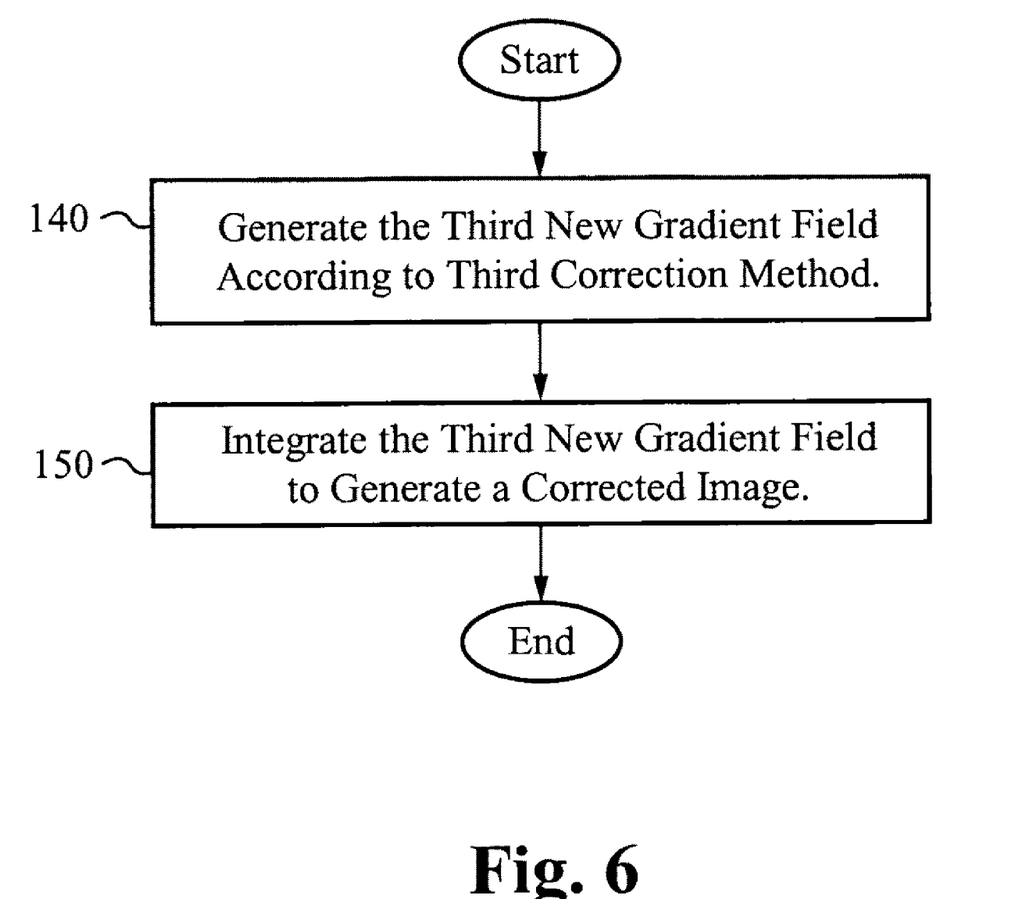
FIG. 6 illustrates a third correction method.

FIG. 6 illustrates the third correction method. The third correction method defines the specific threshold value as 90 degrees. At the step 140, a third new 2D gradient field is generated. For a given pixel, the relative gradient angle is compared to the specific threshold value, which in this case is 90 degrees. If it is determined that the relative gradient angle is greater than or equal to 90 degrees, then for the given pixel, the direction and magnitude of the gradient vector for the third new gradient field is equal to the direction and magnitude of the corresponding gradient vector for the gradient field of the original image. If instead it is determined that the relative gradient angle is less than 90 degrees, then the direction of the gradient vector for the third new gradient field is equal to the direction of the corresponding gradient vector for the gradient field of the original image, and the magnitude of the gradient vector for the third new gradient field is equal to the magnitude of the corresponding gradient vector for the gradient field of the processed image. At the step 150, the third new gradient field is integrated to generate a corrected image. In some embodiments, the integration is performed according to a Fast Fourier Transform.

The correction methods described above work for grayscale images. For typical color images, the correction methods are applied either by first converting the image to grayscale and then converting back to color images, or by applying the correction methods on each of the color channels individually.

Figure 7:
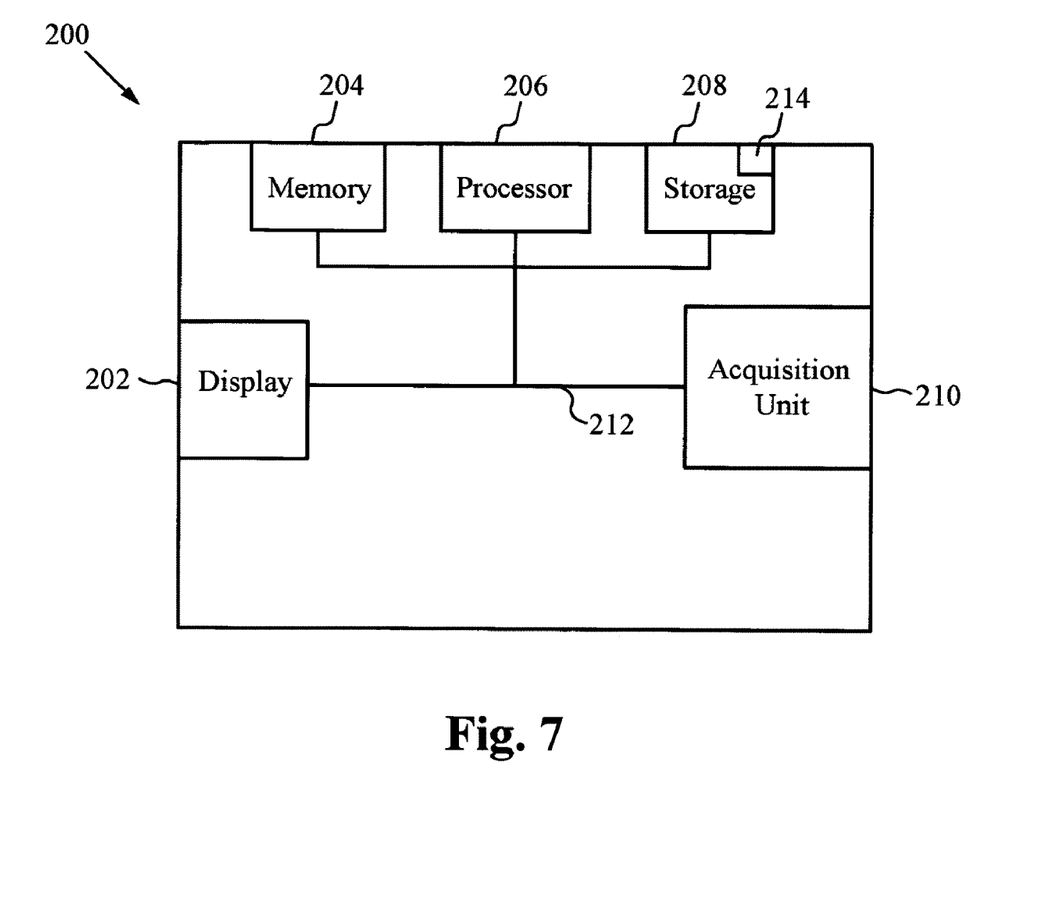
FIG. 7 illustrates a graphical representation of an exemplary computing device configured to implement the detection and correction method of the present invention.

FIG. 7 illustrates a graphical representation of an exemplary computing device configured to implement the detection and correction methods of the present invention. A computing device 200 includes a display 202, a memory 204, a processor 206, a storage 208, an acquisition unit 210, and a bus 212 to couple the elements together. The acquisition unit 210 acquires image data, which is then processed by the processor 206 and temporarily stored in the memory 204 and more permanently stored on the storage 208. The display 202 displays the image data acquired either during acquisition or when utilizing a display feature. When the detection and correction methods described herein are implemented in software, an application 214 resides on the storage 208, and the processor 206 processes the necessary data while the amount of the memory 204 used is minimized. When implemented in hardware, additional components are utilized to process the data, as described above. The computing device 200 is able to be, but is not limited to, a digital camcorder, a digital camera, a cellular phone, PDA, or computer.

In some embodiments, the detection and correction methods are automated. Automatic detection and correction of halo artifacts significantly increases the usability of spatial processing algorithms that would otherwise be considered unsuitable due to their undesirable artifacts. The detection and correction methods are used as a post-processing step after an image has been processed with a spatial processing algorithm, such as a high dynamic range compression algorithm, that generates halo artifacts. The detection and correction methods are used to remove these unwanted halo artifacts. Other types of image processing algorithms that produce halo artifacts may also benefit from this method.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A method of detecting halo artifacts in an image, programmed in a memory of a device, the method comprising:
 a. determining a first two-dimensional gradient field for an image, wherein the first gradient field includes a plurality of first gradient vectors, one first gradient vector associated with each pixel in the image;
 b. determining a second two-dimensional gradient field for a processed image of the image, wherein the second gradient field includes a plurality of second gradient vectors, one second gradient vector associated with each pixel in the processed image, wherein a first pixel in the image corresponds to a first pixel in the processed image;
 c. calculating a gradient angle for each pixel, wherein a first gradient angle is an angle between a first gradient vector associated with the first pixel in the image and a second gradient vector associated with the first pixel in the processed image;
 d. calculating a relative angle for each pixel, wherein a first relative angle for the first pixel in the processed image is the minimum between the first gradient angle and 360 degrees minus the first gradient angle;
 e. identifying a halo artifact, wherein the relative angle equals the halo artifact at each pixel.

2. The method of claim 1 wherein the first gradient angle between the first gradient vector and the second gradient vector is the absolute value.

3. The method of claim 1 wherein the first gradient field is determined according to a scale that identifies a pixel separation distance used in the determination of each first gradient vector.

4. The method of claim 3 wherein the second gradient field is determined according to the scale.

5. The method of claim 4 wherein the scale increases as noise in the image increases.

6. The method of claim 1 wherein the image is a grayscale image.

7. The method of claim 1 wherein if the image is a color image, the method further comprises converting the image to a grayscale image before determining the first two-dimensional gradient field.

8. The method of claim 1 wherein a halo artifact value at each pixel is defined as the relative angle at the pixel.

9. The method of claim 1 wherein a halo artifact value at each pixel is defined as a magnitude of the second gradient vector at the pixel.

10. A method of correcting halo artifacts in an image, the method comprising:
 a. determining a first two-dimensional gradient field for an image, wherein the first gradient field includes a plurality of first gradient vectors, each first gradient vector includes a first magnitude and a first direction;
 b. determining a second two-dimensional gradient field for a processed image of the image, wherein the second gradient field includes a plurality of second gradient vectors, each second gradient vector includes a second magnitude and a second direction, further wherein each second gradient vector corresponds to a specific first gradient vector, thereby forming a first gradient vector and second gradient vector pair;
 c. generating a third two-dimensional gradient field, wherein the third gradient field includes a plurality of third gradient vectors, each third gradient vector corresponds to a specific first gradient vector and second gradient vector pair, and each third gradient vector includes a third magnitude equal to the second magnitude of the corresponding second gradient vector and a third direction equal to the first direction of the corresponding first gradient vector; and
 d. integrating the third gradient field thereby generating a corrected image.

11. The method of claim 10 wherein integrating the third gradient field comprises integrating the third gradient field according to known integrating methods from a two-dimensional gradient field based on a Fast Fourier Transform.

12. The method of claim 10 wherein the plurality of first gradient vectors includes one first gradient vector for each pixel in the image.

13. The method of claim 12 wherein the plurality of second gradient vectors includes one second gradient vector for each pixel in the processed image, wherein a first pixel in the image corresponds to a first pixel in the processed image.

14. The method of claim 13 wherein one first gradient vector and second gradient vector pair corresponds to each pixel.

15. The method of claim 10 wherein the first gradient field is determined according to a scale that identifies a pixel separation distance used in the determination of each first gradient vector.

16. The method of claim 15 wherein the second gradient field is determined according to the scale.

17. The method of claim 10 wherein the image is a grayscale image.

18. The method of claim 10 wherein if the image is a color image, the method further comprises converting the image to a grayscale image before determining a first two-dimensional gradient field.

19. A method of detecting and correcting halo artifacts in an image, the method comprising:
 a. determining a first two-dimensional gradient field for an image, wherein the first gradient field includes a plurality of first gradient vectors, each first gradient vector includes a first magnitude and a first direction;
 b. determining a second two-dimensional gradient field for a processed image of the image, wherein the second gradient field includes a plurality of second gradient vectors, each second gradient vector includes a second magnitude and a second direction;
 c. quantifying a halo artifact value at each pixel;
 d. generating a third two-dimensional gradient field, wherein the third gradient field includes a plurality of third gradient vectors, each third gradient vector includes a third magnitude and a third direction, further wherein if the halo artifact value at a given pixel is less than a predetermined value, then the third magnitude equals the second magnitude and the third direction equals the second direction at the given pixel, and if the halo artifact value at the given pixel is greater than or equal to the predetermined value, then the third magnitude equals the second magnitude and the third direction equals the first direction at the given pixel; and
 e. integrating the third gradient field thereby generating a corrected image.

20. The method of claim 19 wherein quantifying a halo artifact value at each pixel comprises:
 a. calculating a gradient angle for each pixel, wherein the gradient angle defines a difference in the direction between the first gradient vector and the second gradient vector at the given pixel; and
 b. calculating a relative angle for each pixel, wherein the relative angle for the given pixel is the minimum between the gradient angle at the given pixel and 360 degrees minus the gradient angle at the given pixel, further wherein the relative angle equals the halo artifact value at each pixel.

21. The method of claim 19 wherein each second gradient vector corresponds to a specific first gradient vector, thereby forming a first gradient vector and second gradient vector pair, and each third gradient vector corresponds to a specific first gradient vector and second gradient vector pair.

22. The method of claim 19 wherein one first gradient vector is associated with each pixel in the image and one second gradient vector is associated with each pixel in the processed image, further wherein a first pixel in the image corresponds to a first pixel in the processed image.

23. The method of claim 22 wherein a first gradient angle is an angle between a first gradient vector and a second gradient vector associated with the first pixel.

24. The method of claim 19 wherein integrating the third gradient field comprises integrating the third gradient filed according to known integration methods from a two-dimensional gradient field based on a Fast Fourier Transform.

25. The method of claim 19 wherein the first gradient field is determined according to a scale that identifies a pixel separation distance used in the determination of each first gradient vector.

26. The method of claim 25 wherein the second gradient field is determined according to the scale.

27. The method of claim 19 wherein the image is a grayscale image.

28. The method of claim 19 wherein if the image is a color image, the method further comprises converting the image to a grayscale image before determining a first two-dimensional gradient field.

29. A method of detecting and correcting halo artifacts in an image, the method comprising:
   a. determining a first two-dimensional gradient field for an image, wherein the first gradient field includes a plurality of first gradient vectors, each first gradient vector includes a first magnitude and a first direction;
   b. determining a second two-dimensional gradient field for a processed image of the image, wherein the second gradient field includes a plurality of second gradient vectors, each second gradient vector includes a second magnitude and a second direction;
   c. quantifying a halo artifact value at each pixel;
   d. generating a third two-dimensional gradient field, wherein the third gradient field includes a plurality of third gradient vectors, each third gradient vector includes a third magnitude and a third direction, further wherein if the halo artifact value at a given pixel is less than a predetermined value, then the third magnitude equals the second magnitude and the third direction equals the first direction at the given pixel, and if the halo artifact value at the given pixel is greater than or equal to the predetermined value, then the third magnitude equals the first magnitude and the third direction equals the first direction at the given pixel; and
   e. integrating the third gradient field thereby generating a corrected image.

30. The method of claim 29 wherein quantifying the halo artifact value at each pixel comprises:
   a. calculating a gradient angle for each pixel, wherein the gradient angle defines a difference in the direction between the first gradient vector and the second gradient vector at the given pixel; and
   b. calculating a relative angle for each pixel, wherein the relative angle for the given pixel is the minimum between the gradient angle at the given pixel and 360 degrees minus the gradient angle at the given pixel, further wherein the relative angle equals the halo artifact value at each pixel.

31. The method of claim 30 wherein the predetermined value is 90 degrees.

32. The method of claim 29 wherein each second gradient vector corresponds to a specific first gradient vector, thereby forming a first gradient vector and second gradient vector pair, and each third gradient vector corresponds to a specific first gradient vector and second gradient vector pair.

33. The method of claim 29 wherein one first gradient vector is associated with each pixel in the image and one second gradient vector is associated with each pixel in the processed image, further wherein a first pixel in the image corresponds to a first pixel in the processed image.

34. The method of claim 33 wherein a first gradient angle is an angle between a first gradient vector and a second gradient vector associated with the first pixel.

35. The method of claim 29 wherein integrating the third gradient field comprises integrating the third gradient field according to known integration methods from a two-dimensional gradient field based on a Fast Fourier Transform.

36. The method of claim 29 wherein the first gradient field is determined according to a scale that identifies a pixel separation distance used in the determination of each first gradient vector.

37. The method of claim 36 wherein the second gradient field is determined according to the scale.

38. The method of claim 29 wherein the image is a grayscale image.

39. The method of claim 29 wherein if the image is a color image, the method further comprises converting the image to a grayscale image before determining a first two-dimensional gradient field.

40. An apparatus for detecting halo artifacts in an image, the apparatus comprising:
   a. an application for:
      i. determining a first two-dimensional gradient field for an image, wherein the first gradient field includes a plurality of first gradient vectors, each first gradient vector includes a first magnitude and a first direction;
      ii. determining a second two-dimensional gradient field for a processed image of the image, wherein the second gradient field includes a plurality of second gradient vectors, each second gradient vector includes a second magnitude and a second direction;
      iii. quantifying a halo artifact value at each pixel;
      iv. generating a third two-dimensional gradient field, wherein the third gradient field includes a plurality of third gradient vectors, each third gradient vector includes a third magnitude and a third direction, further wherein if the halo artifact value at a given pixel is less than a predetermined value, then the third magnitude equals the second magnitude and the third direction equals the second direction at the given pixel, and if the halo artifact value at the given pixel is greater than or equal to the predetermined value, then the third magnitude equals the second magnitude and the third direction equals the first direction at the given pixel; and
      v. integrating the third gradient field thereby generating a corrected image; and
   b. a processor configured for executing the application; and
   c. a memory coupled to the processor, the memory configured for temporarily storing data for execution by the processor.

41. An apparatus for correcting halo artifacts in an image, the apparatus comprising:
   a. an application for:
      i. determining a first two-dimensional gradient field for an image, wherein the first gradient field includes a plurality of first gradient vectors, each first gradient vector includes a first magnitude and a first direction;
      ii. determining a second two-dimensional gradient field for a processed image of the image, wherein the second gradient field includes a plurality of second gradient vectors, each second gradient vector includes a second magnitude and a second direction, further wherein each second gradient vector corresponds to a specific first gradient vector, thereby forming a first gradient vector and second gradient vector pair;
      iii. generating a third two-dimensional gradient field, wherein the third gradient field includes a plurality of third gradient vectors, each third gradient vector corresponds to a specific first gradient vector and second gradient vector pair, and each third gradient vector includes a third magnitude equal to the second magnitude of the corresponding second gradient vector and a third direction equal to the first direction of the corresponding first gradient vector; and
      iv. integrating the third gradient field thereby generating a corrected image; and
   b. a processor configured for executing the application; and c. a memory coupled to the processor, the memory configured for temporarily storing data for execution by the processor.

42. An apparatus for detecting halo artifacts in an image, the apparatus comprising:
   a. an application for:
      i. determining a first two-dimensional gradient field for an image, wherein the first gradient field includes a plurality of first gradient vectors, each first gradient vector includes a first magnitude and a first direction;
      ii. determining a second two-dimensional gradient field for a processed image of the image, wherein the second gradient field includes a plurality of second gradient vectors, each second gradient vector includes a second magnitude and a second direction;
      iii. quantifying a halo artifact value at each pixel;
      iv. generating a third two-dimensional gradient field, wherein the third gradient field includes a plurality of third gradient vectors, each third gradient vector includes a third magnitude and a third direction, further wherein if the halo artifact value at a given pixel is less than a predetermined value, then the third magnitude equals the second magnitude and the third direction equals the first direction at the given pixel, and if the halo artifact value at the given pixel is greater than or equal to the predetermined value, then the third magnitude equals the first magnitude and the third direction equals the first direction at the given pixel; and
      v. integrating the third gradient field thereby generating a corrected image; and
   b. a processor configured for executing the application; and
   c. a memory coupled to the processor, the memory configured for temporarily storing data for execution by the processor.

* * * * *